Nov. 7, 1961   H. A. KRAFTSON   3,007,340
MEASURING SYSTEM
Filed Sept. 8, 1958
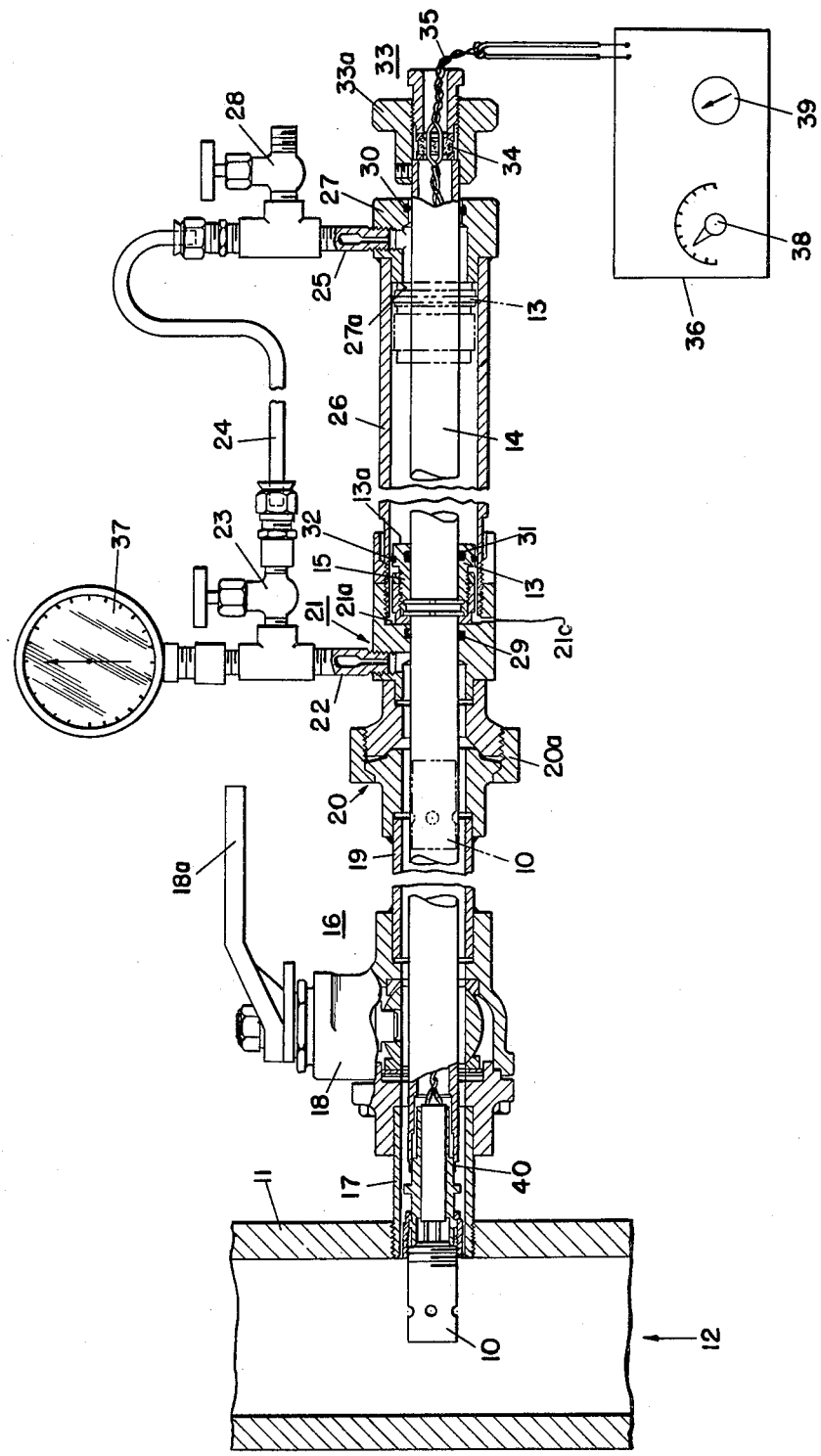

United States Patent Office 3,007,340
Patented Nov. 7, 1961

3,007,340
MEASURING SYSTEM
Harry A. Kraftson, Bala-Cynwyd, Pa., assignor to Leeds and Northrup Company, Philadelphia, Pa., a corporation of Pennsylvania
Filed Sept. 8, 1958, Ser. No. 759,687
2 Claims. (Cl. 73—432)

This invention relates to measuring systems of the type in which properties of materials are determined, as by electrical measurement, and has for an object the provision of a system of utilizing the pressure of fluid whose property is to be measured for moving a detecting element between a measuring position and a retracted position.

The measurement electrically of properties of fluids, liquids and gases, and including fluid-borne streams of solids, is of great importance to processes of widely differing character. Detecting elements, such as thermocouples, Pitot tubes, conductivity cells, and the like, are useful for the making of one or more measurements with considerable accuracy, but in nearly every case it becomes desirable at times either to check the condition of the detecting element, or to replace it. Where the fluid whose property is to be measured is under pressure, it has heretofore been proposed to provide manual means for withdrawing the detecting elements into an associated housing and to provide means for removing such detecting elements without shutting down the process. Inasmuch as the detecting elements and their associated supporting means have necessarily been subjected to the fluid pressure, it will be readily understood that a hazard is involved in withdrawing the detecting elements due to the possibility of leakage and failure of seals. This hazard is increased for fluids under high temperature and fluids which are dangerous to handle. Where the pressures are high, it has been necessary to provide gear trains or multiplying levers in order to move the detecting element against the force developed upon it by the fluid pressure. Since this force may be of great magnitude, a release of the detecting element for movement to the retracted position sometimes occurred with great speed, the speed of movement of the support for the detecting element giving rise to additional hazards to the workmen. If jack screws be utilized, the operation is slow in producing movement in both directions and considerable manual effort is usually necessary.

In carrying out the present invention, there is provided a piston rod which includes the detecting element at one end thereof and a handle at the other end and which is provided with a piston and flow passages for actuation of the piston rod by the pressure of the fluid whose property is to be determined. In this manner, there has been avoided the use of multiplying levers, jack screws, gears, and the like.

The movement of the detecting element from a measuring position to a retracted position may, by suitable throttling, be produced at almost any desired speed, and the system is effective notwithstanding variations of the fluid pressure through relatively wide limits. More particularly, the pressure applied to the detecting element and its supporting piston is utilized to move it from the measuring position to the retracted position. Through a fluid passage, the fluid pressure is applied to one face of the piston of considerably larger area than that of the piston rod for movement of the detecting element from the retracted position to the measuring position. A valve having a straight-through port opening, such as a gate, ball, or plug valve, is interposed in the tubular structure intermediate the two said positions so that when the valve is closed, a suitable connector may be opened to detach the detecting element from the remainder of the equipment permanently attached to the vessel containing the fluid under pressure, at which time the element can be inspected and/or renewed.

For further objects and advantages of the invention, reference is to be had to the following description taken in conjunction with the accompanying drawing, partly in section, which illustrates one embodiment of the invention.

Referring to the drawing, a detecting element 10 has been illustrated in its measuring or detecting position within a fluid conduit 11. Fluid 12 flowing through conduit 11, as indicated by the arrow, may be under relatively high pressure. The detecting element 10 may be a thermocouple, a conductivity cell, a resistance thermometer, or it may be of another kind, the particular type of detecting element being a matter of choice as to which property (including flow rate) of the fluid it is desired to measure.

The detecting element 10 may be maintained in its measuring position by the pressure of fluid 12, or preferably, in the case of liquids, by trapping the fluid in cylinder 26 with piston 13 in the position shown in solid lines. More particularly, the pressure of fluid 12 is applied to the right-hand face 13a of a piston 13 secured to the piston rod 14 as by the coupling structure 15. The fluid pressure is applied to the face 13a interiorly of a tubular structure 16 in which the piston rod 14 carries the detecting element 10 at one end thereof. The tubular structure 16 includes a pipe 17 threaded into the wall of the conduit 11 to form a fluid-tight seal therewith. The fluid pressure is transmitted through the valve 18, a pipe 19, separable coupling means 20, a sub-assembly 21, outwardly thereof by a conduit 22, through valve 23, a conduit 24, and thence by a conduit 25 having an interior passage of reduced diameter into the right-hand end of a cylinder 26 within which the piston 13 is located. The cylinder 26 forms a part of the tubular structure and is conveniently made from a length of pipe with an end cap (or block), such as 27, welded thereto.

In the foregoing description, it has been assumed that the valve 23 is in the open position and that a valve 28 is in the closed position. The assembly securing the piston 13 to the rod 14 is illustrated in a position abutting the face 21a of sub-assembly 21. This limits in one direction the movement of the detecting element 10 inwardly of the conduit 11.

Suitable packing means are provided, such as by O-rings 29, 30 and 31, encircling piston rod 14. The piston 13 also includes suitable packing rings, such as provided by an O-ring 32. Whenever it is desired to inspect or replace the detecting element 10, it is only necessary to close the valve 23 and to open the valve 28. The closure of valve 23 removes the application of the fluid pressure to the face 13a of piston 13. The opening of valve 28 bleeds the pressure from the cylinder 26. Due to the restriction in the passageway to valve 28, the pressure within cylinder 26 is relieved at a reduced rate to prevent uncontrolled movement of the piston rod 14. While the movable assembly including piston rod 14 may move fairly rapidly, its speed is maintained below that which would apply a hammer blow to the face 27a of the end flange or fitting 27. In this connection, and since the left-hand part 21a of the cylinder is vented to atmosphere as shown by passage 21c it is to be noted that the passageway through the conduit 22 is likewise restricted for a controlled movement of the movable assembly from the retracted position to the measuring position, as will later be described.

After the movable assembly including piston rod 14 has arrived at the retracted position, the left-hand end of detecting element 10 will be located in its retracted position well to the right of the valve 18. This valve 18 has its port positioned on its main axis along which axis the piston rod 14 is moved. With element 10 in its retracted position, this valve may be closed by an operating handle 18a to seal the tubular structure 16 from the fluid pressure in conduit 11. Accordingly, a locking ring 20a may be unscrewed after the pressure from the tubular structure 16 to the right of valve 18 has been relieved of pressure as by opening valves 23 and 28. The operator will know by observing a pressure gauge 37 when the bleeding operation is complete. Thereafter, the coupling element 20a may be safely unthreaded and removed. That portion of the tubular structure 16 to the right of assembly 20 is thereby disconnected from the left-hand portion of the assembly. The movable structure including rod 14 and detecting element 10 may then be removed from the structure for inspection or replacement of element 10.

If the element 10 be replaced, it will be understood that the foregoing steps will be performed in the reverse order. The detecting element will be moved into its retracted position, the mounting ring 20a again threaded onto its associated threaded fitting. The valves 23 and 28 will be in the closed position. After the coupling ring 20a is made secure, the valve 18 will be opened. The system is now in readiness for movement of the detecting element 10 to the measuring or detecting position. This is accomplished by merely opening the valve 23 to apply the fluid pressure to the face 13a of the piston. The cross-sectional area of the face 13a is substantially larger than that of the piston rod 14 where it passes through seal 29. It is necessary that the area of face 13a be large enough so that the force developed on this surface by the fluid pressure of fluid 12 applied through conduit 24 will be adequate to overcome the opposite force caused by the pressure of fluid 12 on the projected cross-sectional area of piston rod 14 at seal 29 and the frictional resistance of the packings to produce positive movement of detecting element 10 into conduit 11 against the pressure within conduit 11. In one embodiment of the invention, the effective cross-sectional area of rod 14 at seal 29 was of the order of 0.5 square inch, whereas the effective area of the face 13a of piston 13 was of the order of 1.1 square inches. This differential in effective cross-sectional areas was found adequate to assure satisfactory operation with fluid pressures from less than 50 to more than 500 pounds per square inch and notwithstanding variations in that fluid pressure.

The pressure indicator 37 is pressure-connected to the inlet side of valve 23. Though not necessary to the invention, it is a convenience for the operator to know at all times the magnitude of the fluid pressure within conduit 11, and particularly the existence of any pressure within the tubular structure 16 with valve 18 closed.

Those skilled in the art will understand how, for particular applications, to vary the differential of areas to assure the desired transport of the detecting element 10 between its measuring and retracted positions.

Basically, the effective area 13a must always be greater than the cross-sectional area of piston rod 14 where it passes through seal 29. The effective area of the piston rod at seal 29 must be great enough so that the force obtained by multiplying that area by the static pressure of fluid 12 will be sufficient to overcome frictional forces developed in the retracting operation. The effective area 13a of piston 13 must be sufficiently greater than the effective area of the piston rod at seal 29 so that the difference between said areas multiplied by the static pressure of fluid 12 will be sufficient also to overcome frictional forces developed in the inserting operation.

As the pressure of fluid 12 increases, correspondingly greater forces will become available to overcome frictional forces without changing said areas. Thus, for given selected values of said area, there is no theoretical upper limit to the pressure of fluid 12 which may be handled during the insertion or retraction cycles of the device. This feature is an inherent advantage of the invention.

Under some conditions the fluid pressure in conduit 11 may drop below that needed for positive actuation of the piston rod 14. When such a reduced pressure appears, the system is nevertheless operative with a slight amount of assistance provided as by manually grasping the handle 33a to apply an aiding force in the desired direction. This force will be of a relatively low magnitude. The handle 33a is provided by reason of the fact that the piston rod 14 has a length materially greater than the sum of the length of the tubular or housing structure (including the pipe 17, valve 18, pipe 19, coupling means 20, sub-assembly 21 and cylinder 26) plus the length of the cylinder 26 within which the piston 13 is located. Thus, at all times, whether the detecting element 10 is in its measuring or retracted positions, a portion of the piston rod 14 having a handle 33a secured thereto, is disposed outwardly of the end flange 27 of the housing structure.

The connector 33 includes internally thereof packing means 34 to form a seal (to exclude atmospheric contamination) about conductor 35 extending through the hollow piston rod 14 to the detecting element 10. The seal 40, to exclude line fluid 12 from contact with the conductors 35 and associated parts, is provided at or near the element 10. These conductors 35 at one end terminate at the measuring equipment 36 illustrated as including a meter 39 and a knob 38 utilized for measurement and/or control functions.

It is to be understood that while the valves 23 and 28 have been shown as separate, they may be combined into a single multi-way valve and that instead of being hand-operated, they may, for example, be solenoid-operated with associated control circuits, each of which may be labeled for the particular function to be performed, i.e., to move the detecting element 10 to "detecting position," and to "retracted position." There may be included a switch labeled "disassembly."

What is claimed is:

1. An apparatus for measuring a property of a fluid under pressure comprising a piston rod, a detecting element secured to one end of said piston rod, a measuring instrument, conductors extending through said piston rod and outwardly from the end remote from said detecting element interconnecting said detecting element and said instrument, housing structure forming an elongated cylinder for said piston rod, sealing means disposed between said piston rod and said housing structure, said housing structure having throughout a given length thereof a diameter materially larger than that of said piston rod, a piston secured to said piston rod for movement throughout the region of said housing structure of enlarged diameter, said piston rod having a length materially greater than the sum of the length of said housing structure plus the length of the housing structure of enlarged diameter for disposition at all times of a portion of said piston rod outwardly of said housing structure, from the end thereof remote from said detecting element, said last-named portion of said piston rod providing for application of manual forces to said piston rod for control of the movement of said rod, and means selectively operable in response to said fluid under pressure for movement of said detecting element to an exposed position within said fluid under pressure and to a retracted position within said housing including a passageway having valve means for application to said region of said housing structure of enlarged diameter of said fluid under pressure and for venting the same whereby forces are developed on the face of said piston remote from said detecting element for movement of said detecting element from the retracted position to the measuring position against the frictional force developed by said sealing means and against the force of said fluid as applied to said piston rod, said piston rod having a cross-sectional area in the region of said sealing means for the development of fluid forces of magnitude greater than said frictional forces for movement of said detecting element from the measuring position to the retracted position when said fluid is vented from said region of said housing structure of enlarged diameter.

2. In a system for determining a property of a fluid material under pressure having a detecting element movable between a measuring position and a retracted position and responsive to changes in the property of said fluid material when the detecting element is in its measuring position, the combination of a piston rod having said detecting element secured to one end thereof, a measuring instrument, conductors extending through said piston rod and outwardly from the other end thereof interconnecting said detecting element and said instrument, elongated housing structure forming a cylinder and having said piston rod slidably mounted therein, one end of said housing structure having a flow connection to said fluid material, first and second sealing means disposed between said housing structure and said piston rod, said first sealing means being located at the other end of said housing structure, said second sealing means being located at an intermediate point in said housing structure, said housing structure between said first and said second sealing means having a greater internal diameter than the outside diameter of said piston rod, a piston slidably mounted in said cylinder and secured to said piston rod for movement throughout a stroke defined by the region of said greater internal diameter of said housing structure, said piston rod having a cross-sectional area in the region of said second sealing means for the development of first fluid forces tending to move said detecting element to its retracted position whereby the magnitude of said first fluid forces is greater than the frictional forces developed by the relative movement of said piston rod against said first and second sealing means, restricted flow connections having valve means for application of said fluid material under pressure to the face of said piston remote from said detecting element, said cylinder in a region adjacent said second sealing means being vented to atmosphere, the cross-sectional area of said face of said piston being substantially greater than the cross-sectional area of said piston rod for the development of second fluid forces greater than said first fluid forces and said frictional forces for movement of said detecting element from its retracted position to its measuring position, and means for venting at a restricted rate said housing structure between said face of said piston and said first sealing means for movement of said detecting element from its measuring position to its retracted position, said piston rod having a length materially greater than the sum of the length of said housing structure plus the length of said stroke for disposition at all times of a portion of said piston rod outwardly of said other end of said housing structure, said last-named portion of said piston rod providing for application of manual forces to said piston rod for control of movement of said piston rod.

References Cited in the file of this patent

UNITED STATES PATENTS

| | | |
|---|---|---|
| 2,351,764 | Jarrett | June 20, 1944 |
| 2,815,663 | Lupfer | Dec. 10, 1957 |